United States Patent
Lu

(10) Patent No.: US 6,954,715 B2
(45) Date of Patent: Oct. 11, 2005

(54) SYSTEM AND METHOD FOR EQUIPMENT MALFUNCTION DETECTION AND DIAGNOSIS

(75) Inventor: Ching-Shan Lu, Taichung (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 48 days.

(21) Appl. No.: 10/654,760

(22) Filed: Sep. 4, 2003

(65) Prior Publication Data

US 2004/0044500 A1 Mar. 4, 2004

(30) Foreign Application Priority Data

May 9, 2002 (TW) ........................................ 91120264 A

(51) Int. Cl.[7] ........................ G06F 15/00; G06F 11/30
(52) U.S. Cl. ................................................... 702/183
(58) Field of Search ........................ 700/100–111, 121, 700/174, 175; 438/5; 702/182–185

(56) References Cited

U.S. PATENT DOCUMENTS

| | | | | |
|---|---|---|---|---|
| 5,862,054 A | * | 1/1999 | Li | 700/121 |
| 6,298,377 B1 | * | 10/2001 | Hartikainen et al. | 709/223 |
| 6,519,552 B1 | * | 2/2003 | Sampath et al. | 702/183 |
| 6,556,949 B1 | * | 4/2003 | Lyon | 702/182 |
| 6,590,179 B2 | * | 7/2003 | Tanaka et al. | 219/121.43 |
| 6,633,782 B1 | * | 10/2003 | Schleiss et al. | 700/26 |
| 6,694,287 B2 | * | 2/2004 | Mir et al. | 702/183 |
| 6,766,258 B1 | * | 7/2004 | Stewart et al. | 702/35 |
| 6,785,586 B1 | * | 8/2004 | Toprac et al. | 700/175 |
| 2001/0005821 A1 | * | 6/2001 | Ottosson | 702/185 |
| 2002/0010562 A1 | * | 1/2002 | Schleiss et al. | 702/183 |

* cited by examiner

*Primary Examiner*—Bryan Bui
*Assistant Examiner*—Demetrius Pretlow
(74) *Attorney, Agent, or Firm*—Thomas, Kayden, Horstemeyer & Risley

(57) ABSTRACT

A system and method for equipment malfunction detection and diagnosis. The system includes equipment and a detection/diagnosis unit. The equipment transfers status information thereof to the detection/diagnosis unit at preset intervals. The detection/diagnosis unit receives and stores the status information of the equipment, and checks whether the status information conforms to a process control standard. If not, it is determined that the equipment has a malfunction, and the detection/diagnosis unit generates a notification or warning message, stops the operation of the equipment, and retrieves a recovery measure for the malfunction from a diagnostic database.

14 Claims, 3 Drawing Sheets

SYSTEM AND METHOD FOR EQUIPMENT MALFUNCTION DETECTION AND DIAGNOSIS

BACKGROUND

The present invention relates to a system and method for equipment malfunction detection and diagnosis, and particularly to a system and method that monitors equipment status, determines whether it malfunctions in real time, and provides corresponding recovery measures for the malfunction.

If semiconductor equipment experiences malfunction, it is often difficult to locate the responsible process, such that all processed wafers must be discarded or manually repaired through complicated processes, thereby increasing the manufacture time and related cost.

For current production equipment, the effect of process improvement is limited if only process end result data is collected. In addition, there is no effective mechanism to determine whether equipment has malfunctioned, or the process environment has leakage, such that process and equipment administration cannot recover operations in real time.

SUMMARY OF THE INVENTION

It is therefore an object of the present invention to provide a system and method that monitors equipment status, collects related information, determines whether equipment has malfunctioned in real time, and provides corresponding recovery measures.

To achieve the above object, the present invention provides a system and method for equipment malfunction detection and diagnosis. The system includes equipment and a detection/diagnosis unit. The equipment transfers status information therefrom to the detection/diagnosis unit at preset intervals. The detection/diagnosis unit receives and stores the status information of the equipment, and checks whether the status information conforms to a process control standard. If not, it is determined that the equipment has a malfunction and the detection/diagnosis unit generates a notification or warning message.

In addition, if the equipment has a malfunction, the detection/diagnosis unit stops the operation of the equipment, and retrieves a recovery measure for the malfunction from a diagnostic database.

The present invention also discloses a method for equipment malfunction detection and diagnosis. In the method, status information of equipment is first transferred to a detection/diagnosis unit at preset intervals. Then, the status information is checked to determine whether it conforms to a process control standard. If not, it is determined that the equipment has a malfunction and a notification or warning message is generated.

In addition, the status information is further stored to a status information database. If the equipment has a malfunction, the operation of the equipment is stopped, and a recovery measure for the malfunction is retrieved from a diagnostic database.

The status information includes a parameter value corresponding to at least one process parameter. The equipment may be semiconductor furnace equipment, and the process parameter may be a processed material ID (identity), a wafer count, a process program ID, a chamber ID, an operator ID, a boat map, a step ID, a zone temperature, a pressure, a MFC (Mass Flow Controller), a gas flow, a valve opening angle or a leakage pressure.

BRIEF DESCRIPTION OF THE DRAWINGS

The aforementioned objects, features and advantages of the invention will become apparent by referring to the following detailed description of the preferred embodiment with reference to the accompanying drawings, wherein.

DETAILED DESCRIPTION OF THE INVENTION

Figure 1:
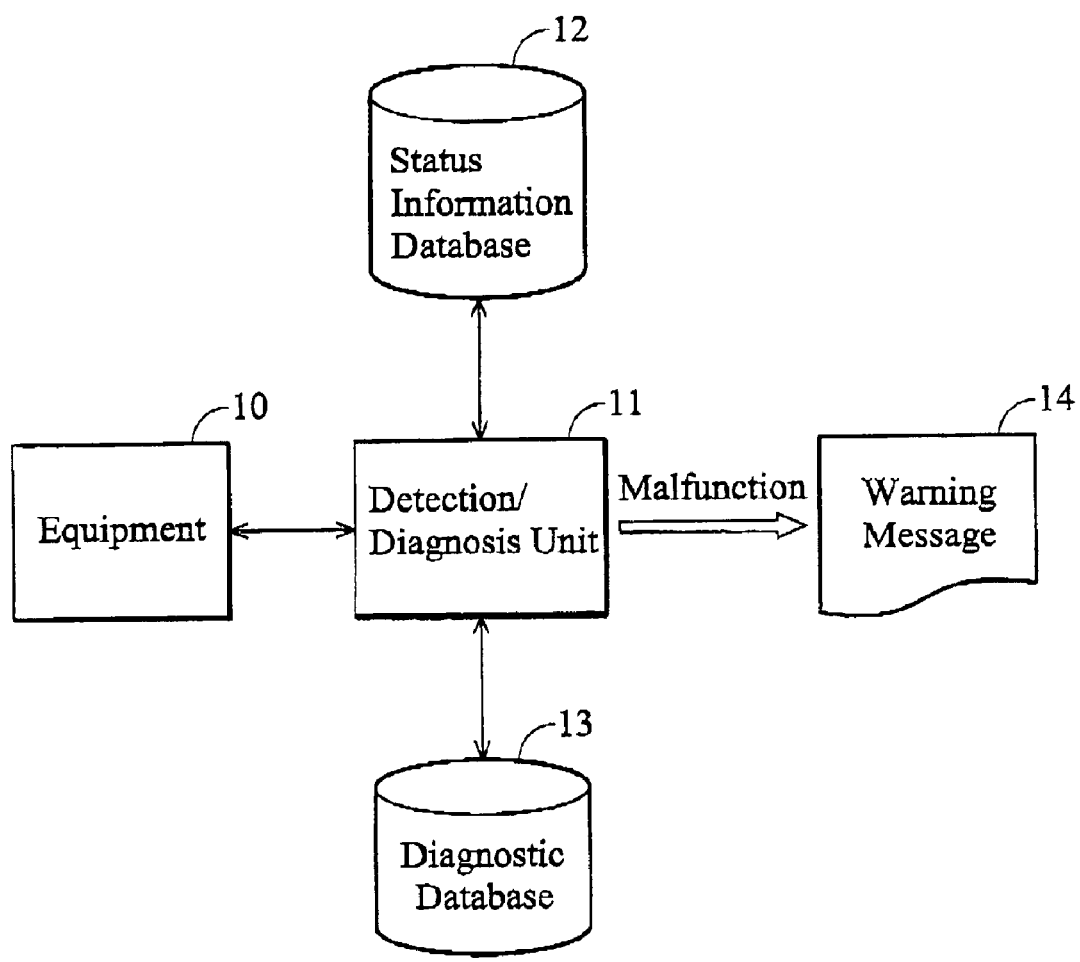
FIG. 1 is a schematic diagram illustrating the system architecture of the system for equipment malfunction detection and diagnosis according to the embodiment of the present invention.

FIG. 1 illustrates the system architecture of the system for equipment malfunction detection and diagnosis according to an embodiment of the present invention.

As shown in FIG. 1, the system for equipment malfunction detection and diagnosis according to an embodiment of the present invention includes equipment 10, a detection/diagnosis unit 11, a status information database 12 and a diagnostic database 13.

Figure 3:
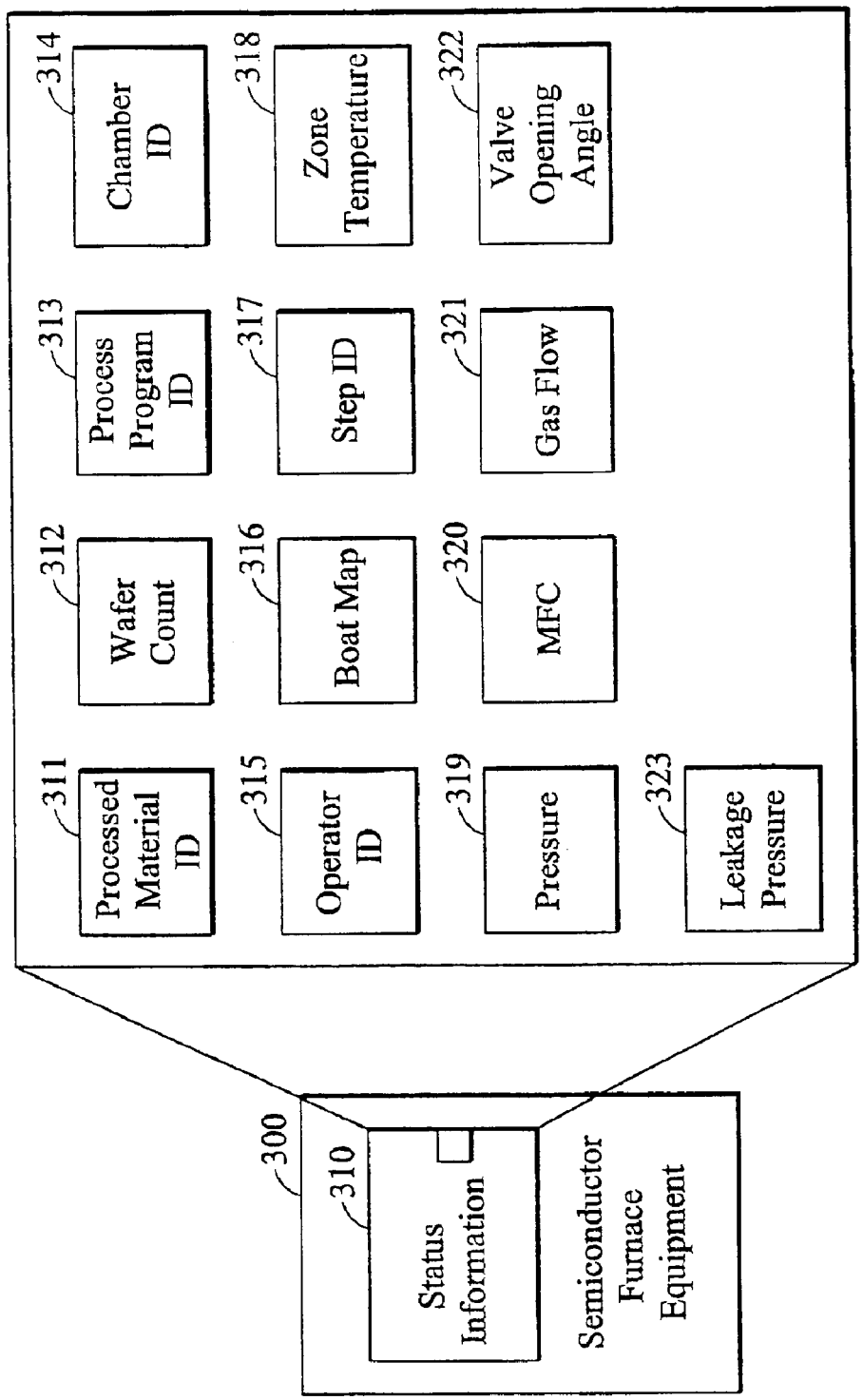
FIG. 3 is a schematic diagram illustrating semiconductor furnace equipment and status information therein.

The equipment 10 may be semiconductor furnace equipment, but is not limited thereto. The equipment 10 transfers status information of the equipment 10 to the detection/diagnosis unit 11 at preset intervals, such as 15 seconds. It is understood that the status information of the equipment 10 may include a parameter value corresponding to at least one process parameter. FIG. 3 is a schematic diagram illustrating semiconductor furnace equipment and status information therein. As shown in FIG. 3, the status information 310 of the semiconductor furnace equipment 300 comprises the parameter value for the process parameters comprising a processed material ID (identity) 311, a wafer count 312, a process program ID 313, a chamber ID 314, an operator ID 315, a boat map 316, a step ID 317, a zone temperature 318, a pressure 319, a MFC (Mass Flow Controller) 320, a gas flow 321, a valve opening angle 322 or a leakage pressure 323. It is understood that the process parameter may differ for various equipment and processes, and thus is not limited to the above-described examples.

The detection/diagnosis unit 11 receives the status information from the equipment 10, and stores it to the status information database 12. At the same time, the detection/diagnosis unit 11 checks whether the received status information conforms to a process control standard. If not, it is determined that the equipment 10 has a malfunction and the detection/diagnosis unit 11 generates a notification or warning message 14 to related process and equipment engineers. It is understood that the process control standard may be a quality control chart, such as SPC (Statistical Process Control) chart for respective process parameters, with each SPC chart recording threshold limitations of the process parameter.

In addition, if the detection/diagnosis unit 11 determines that the equipment 10 malfunctions, it stops operation of the equipment 10. The detection/diagnosis unit 11 may retrieve a recovery measure for the malfunction from the diagnostic database 13 according to the process parameter not conforming to its corresponding threshold limitation. The diagnostic database 13 may store recovery measures for respective process parameters.

Figure 2:
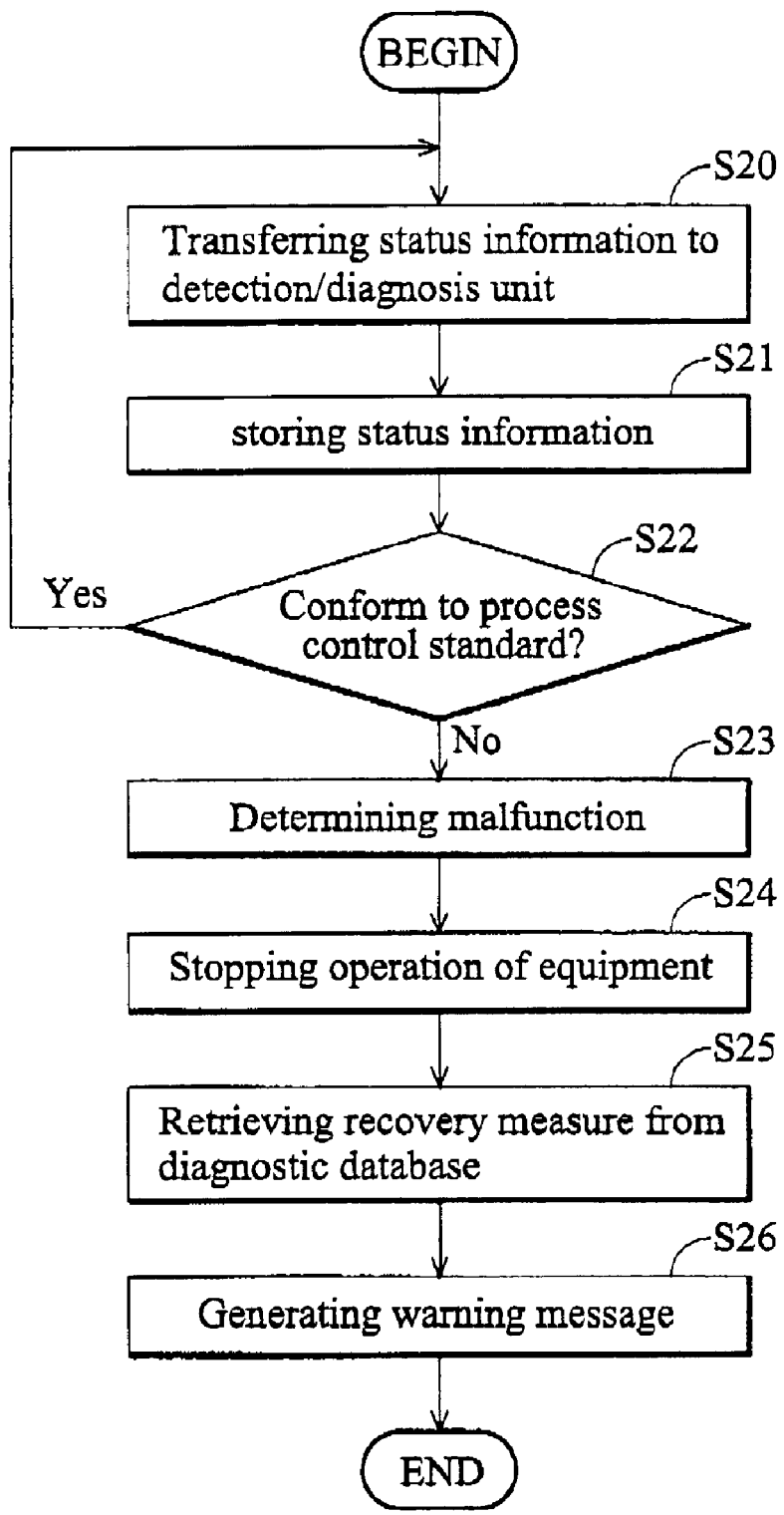
FIG. 2 is a flowchart showing the process for the method for equipment malfunction detection and diagnosis according to the embodiment of the present invention.

FIG. 2 shows the process of the method for equipment malfunction detection and diagnosis according to an embodiment of the present invention.

First, in step S20, the equipment 10 transfers status information of the equipment 10 to the detection/diagnosis unit 11 at preset intervals. Similarly, the status information of the equipment 10 may include a parameter value corresponding to at least one process parameter, in which the process parameter may be processed material ID (identity), wafer count, process program ID, chamber ID, operator ID, boat map, step ID, zone temperature, pressure, MFC (Mass Flow Controller), gas flow, valve opening angle or leakage pressure. It is understood that the process parameter may differ for various equipment and processes, and thus is not limited to the above-described examples.

After the detection/diagnosis unit 11 receives the status information from the equipment 10, in step S21, the detection/diagnosis unit 11 stores it to the status information database 12, in which the data in the status information database 12 can be used by related process and equipment engineers for further analysis.

Then, in step S22, the detection/diagnosis unit 11 checks whether the received status information conforms to the process control standard. If so (Yes in step S22), the flow returns to step S20. If not (No in step S22), in step S23, the detection/diagnosis unit 11 determines the equipment 10 has a malfunction, and in step S24, stops operation of the equipment 10. Thereafter, in step S25, the detection/diagnosis unit 11 retrieves a recovery measure for the malfunction from the diagnostic database 13 according to the process parameter not conforming to its corresponding threshold limitation, and in step S26, generates a notification or warning message 14 to related process and equipment engineers.

Using the system and method for equipment malfunction detection and diagnosis according to the present invention, the status and related processing information of the equipment can be effectively monitored and collected, and it can be determined in real time whether the equipment has malfunctioned, thereby providing corresponding recovery measures.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system for equipment malfunction detection and diagnosis, comprising:
   equipment to process semiconductor work pieces and transfer status information thereof at preset intervals;
   a detection/diagnosis unit coupled to the equipment to receive the status information, check whether the status information conforms to a process control standard, and if not, determine that the equipment has a malfunction; and
   a diagnostic database storing at least a recovery measure for the malfunction,
   wherein the recovery measure is retrieved by the detection/diagnosis unit if the equipment malfunctions.

2. The system as in claim 1 further comprising a status information database for storing the status information of the equipment.

3. The system as in claim 1 wherein the detection/diagnosis unit further generates a notification if the equipment malfunctions.

4. The system as in claim 1 wherein the detection/diagnosis unit further stops operation of the equipment if the equipment malfunctions.

5. The system as in claim 1 wherein the status information comprises a parameter value corresponding to at least a process parameter.

6. The system as in claim 5 wherein the equipment is semiconductor furnace equipment.

7. The system as in claim 6 wherein the process parameter comprises a processed material identity, a wafer count, a process program identity, a chamber identity, an operator identity, a boat map, a step identity, a zone temperature, a pressure, a mass flow controller, a gas flow, a valve opening angle, or a leakage pressure.

8. A method for equipment malfunction detection and diagnosis, comprising the steps of:
   processing semiconductor work pieces on equipment;
   transferring status information of the equipment at preset intervals to a detection/diagnosis unit;
   checking whether the status information conforms to a process control standard, and if not, determining that the equipment has a malfunction; and
   retrieving a recovery measure for the malfunction from a diagnostic database by the detection/diagnosis unit.

9. The method as in claim 8 further comprising storing the status information of the equipment.

10. The method as in claim 8 further comprising generating a notification if the equipment malfunctions.

11. The method as in claim 8 further comprising stopping operation of the equipment if the equipment malfunctions.

12. The method as in claim 8 wherein the status information comprises a parameter value corresponding to at least one process parameter.

13. The method as in claim 12 wherein the equipment is semiconductor furnace equipment.

14. The method as in claim 13 wherein the process parameter comprises a processed material identity, a wafer count, a process program identity, a chamber identity, an operator identity, a boat map, a step identity, a zone temperature, a pressure, a mass flow controller, a gas flow, a valve opening angle, or a leakage pressure.

* * * * *